(12) United States Patent
Coyne, III et al.

(10) Patent No.: US 12,106,315 B2
(45) Date of Patent: Oct. 1, 2024

(54) RESEARCH KIT AND METHODS FOR COMPLETING REMOTE ETHNOGRAPHIC RESEARCH

(71) Applicant: Matchstick LLC, Boonton, NJ (US)

(72) Inventors: Martin Michael Coyne, III, Towaco, NJ (US); Erika L. Bajars, Towaco, NJ (US); Ronak N. Kadakia, South Plainfield, NJ (US)

(73) Assignee: Matchstick LLC, Boonton, NJ (US)

( * ) Notice: Subject to any disclaimer, the term of this patent is extended or adjusted under 35 U.S.C. 154(b) by 110 days.

(21) Appl. No.: 17/572,114

(22) Filed: Jan. 10, 2022

(65) Prior Publication Data

US 2022/0129927 A1  Apr. 28, 2022

Related U.S. Application Data

(63) Continuation of application No. 15/614,821, filed on Jun. 6, 2017, now abandoned.

(60) Provisional application No. 62/346,665, filed on Jun. 7, 2016.

(51) Int. Cl.
*G06Q 30/0201* (2023.01)
*G06Q 10/083* (2024.01)
*G06Q 30/0203* (2023.01)
*G06Q 50/60* (2024.01)

(52) U.S. Cl.
CPC ..... *G06Q 30/0203* (2013.01); *G06Q 30/0201* (2013.01); *G06Q 50/60* (2024.01)

(58) Field of Classification Search
CPC ........ G16H 40/67; G16H 40/60; G06Q 10/06; G06Q 50/10; A61J 7/0053; A61J 7/0076
See application file for complete search history.

(56) References Cited

U.S. PATENT DOCUMENTS

| | | | | |
|---|---|---|---|---|
| 5,921,396 A | * | 7/1999 | Brown, Jr. | A61B 10/007 206/569 |
| 6,242,463 B1 | * | 6/2001 | Reitberg | G16H 10/20 514/654 |
| 7,251,609 B1 | * | 7/2007 | McAlindon | G16H 10/20 707/999.009 |
| 8,429,547 B2 | * | 4/2013 | Hussam | G06F 3/0481 715/753 |
| 2002/0013906 A1 | * | 1/2002 | Wallach | G16H 80/00 713/185 |

(Continued)

OTHER PUBLICATIONS

Santos, I. C. T. (2013). Product development methodologies: The case of medical devices (10596280). Available from ProQuest Dissertations and Theses Professional. (1914884665). Retrieved from https://dialog.proquest.com/professional/docview/1914884665?accountid=131444 (Year: 2013).*

*Primary Examiner* — Michael P Harrington
(74) *Attorney, Agent, or Firm* — Servilla Whitney LLC

(57) ABSTRACT

A research kit and methods for facilitating collection of highly usable participant interview clips while conducting ethnographic research is disclosed. An ethnographic research kit may include an outer shipping container for outbound shipping to the participant; tracking information to track delivery of the package from the researchers to and from the participants; camera positioning stickers attached to the outer shipping container, a tablet/smartphone stand; and a return mailer container. A method for using the ethnographic research kit is also disclosed.

20 Claims, 11 Drawing Sheets

(56) References Cited

U.S. PATENT DOCUMENTS

| | | | |
|---|---|---|---|
| 2005/0053904 A1* | 3/2005 | Shephard | A61B 5/16 |
| | | | 128/920 |
| 2005/0086257 A1* | 4/2005 | Wright | G06Q 10/10 |
| 2012/0009555 A1* | 1/2012 | Hanina | G16H 20/17 |
| | | | 434/262 |

* cited by examiner

RESEARCH KIT AND METHODS FOR COMPLETING REMOTE ETHNOGRAPHIC RESEARCH

CROSS-REFERENCE TO RELATED APPLICATIONS

This application is a continuation of U.S. application Ser. No. 15/614,821 filed on Jul. 6, 2017, which claims priority under 35 U.S.C. § 119(e) to U.S. Provisional Application No. 62/346,665, filed Jun. 7, 2016, and U.S. Provisional Application No. 62/172,412, filed Jun. 8, 2015 the disclosures of which are incorporated herein by reference in their entirety.

TECHNICAL FIELD

Principles and embodiments of the present disclosure relate to a research kit and methods for obtaining remote participant interviews for conducting ethnographic research.

BACKGROUND

When developing products or services, designers and marketers rely on various research techniques to understand unmet user needs, study the environment where products are used, or test prototypes. Research can be conducted at a dedicated site where the user or study participant comes to the researcher, or researchers can travel to the study participant.

For situations requiring the study participant to come to a research facility, market or user research is frequently conducted in purpose-built facilities such as focus group rooms or interview suites. In order to ensure access to sufficient numbers of qualified study participants, the research facilities are typically located in major metropolitan areas where there are major population centers, such as New York City, Chicago, Los Angeles, or Philadelphia. Interviews take place at a scheduled time and location and the research participants report to a facility where they participate alongside other research participants in a "focus group" or in an individual discussion with a moderator in an "in-depth interview" or "IDI".

While these research techniques are convenient for the interviewer and study participants, there are several shortcomings that pose significant difficulties for some kinds of research. One such shortcoming is that the research facilities are "artificial" settings compared to the normal use environment, therefore user biases may be introduced by the "artificial" settings which results in incomplete or misleading feedback. For instance, in device research, participants may be asked to demonstrate use of a device at a table top and desk chair, when instead, in the true use setting, this environment is not used, and the table is not present.

Another shortcoming is that scheduled interviews lack situational context because study participants can do no more than explain or describe the process to the interviewer in the interview room, rather than performing the process of interest real time, thereby leaving significant gaps in information. For instance, researchers in the medical space might want to observe where a patient stores medication, administers their medication, or how they travel with their medication. However, it is difficult to get a full picture using a traditional interview in a research facility. Without situational context, the interviewer must ask detailed questions to obtain information on topics of interest. This may lead to incomplete and inadequate information gathering due to time constraints and/or limitations of the interviewer.

In addition, participants can forget to bring relevant materials, or may not have relevant materials on hand at the time of the interview. Specifically, materials that users may need to complete an activity may not be at hand or forgotten when requested to bring such relevant materials to the research center. Often, researchers will ask participants to bring samples of different products to the facility to support the interview agenda. If study participants forget these necessary materials, the interview value is decreased as participants rely on mental recall rather than a physical artifact.

Moreover, even if study participants bring the necessary materials, it is nearly impossible to have them demonstrate usage in a "real life" situation due to the constraints of a research setting. For example, patients are reluctant to administer medication in a research facility, and administration of medication may also entail legal liability for the research facility if something goes wrong. In addition, for some research topics, such as medication administration, the medication of interest may not be administered on the research day or at the time the interview is scheduled. If the research timing and the activity of interest (e.g. medication administration) are not aligned, opportunities to discuss the specifics of such activity may be missed, or the research will depend on the participant's recollection of the activity, rather than direct observation of the activity.

Another drawback to conducting research in a research facility is that the feedback from the study participant may not be sufficiently detailed. Even if study participants patients recall the topic or activity of interest correctly, relevant information such as passive cues including body language, unarticulated steps in the process, ambient noise, observation of lighting or use environment, or sounds that are made as the device is used are missing from data collection. For many topics in medical research, these small details are more important than what the participant might verbalize, opine, or believe to be important. In person research techniques such as IDIs or focus groups are well suited for exploring topics or activities of interest which may be recalled, but poorly suited for exploring passive cues including body language, unarticulated steps in the process, ambient noise, observation of lighting or use environment, or sounds that are made as the device.

In many instances, the study participants may be stressed or anxious due to observation bias formed as a result of the research facility setting. Specifically, many research facilities frequently feature one-way mirrors, cameras, and microphone setups that highlight the notion that "someone is watching." In addition, the presence of an unfamiliar observer may be unnerving to some study participants. In other instances, the mere aspect that someone is taking notes during an interview may be unnerving. In yet other cases, participants may be inclined to provide the answer they believe is expected of them, rather than profess the truth to an unknown interviewer. For sensitive topics such as medical research, this "observation effect" may inhibit conversation and feedback necessary for sufficient and accurate data collection that is critical to product development.

Multiple people may also be involved in the topic being researched, some of whom are not present in the research facility or cannot be present in the research facility due to infirmity, schedule conflicts or other unforeseen reasons. In addition, research on older participants or participants requiring caregiver assistance is often difficult to schedule in an offsite facility where travel makes participation difficult.

As a result, otherwise qualified study participants, may not be able to participate in research activities. For instance, patients who are handicapped or live far from a research facility are difficult to represent in traditional research activities.

Similar shortcomings are encountered for situations requiring the researchers to travel to the location of the study participant.

To address these shortcomings, researchers utilize a research technique called ethnographic research wherein trained observers go to the study participant's home, office, or care setting, and accompany or "shadow" the study participant for portion of a day while taking detailed notes, recordings, and photographs. Ethnographic research is an intensive, costly, and lengthy process. The number of potential study participants is limited by the ability to recruit study participants who would welcome researchers into their homes and the ability of research teams to travel and observe each individual study participant. Traditional ethnographic research involves researcher time and travel, as well as honoraria payments to the participants. Traditional ethnographic research is potentially intrusive, as "strangers" come into a participant's home armed with cameras, clipboards, and the like.

Therefore, there is need to create a research technique that bridges the different current approaches while preserving essential elements of both facility based research and ethnographic research. There is need to create a research technique that is: 1) comfortable for participants; 2) cost effective; 3) can be deployed anywhere nationally without being constrained by the location of population centers; and 4) can provide rich feedback as an input to device development in a rapid way.

SUMMARY

In a first aspect of the present invention, an ethnographic research kit is disclosed comprising an outer shipping container; package tracking information; camera positioning stickers attached to the outer shipping container; one or more sequentially numbered opaque envelopes having one or more test devices or samples; a tablet/smartphone stand; and a return mailer container.

In one or more embodiment of the present invention, the ethnographic research kit further comprises prepaid postage on the return mailer container.

In one or more embodiment of the present invention, the ethnographic research kit further comprises return shipping supplies.

In one or more embodiment of the present invention, the return mailer container is sealed with a temporary closure label. The return mailer container may further comprise a series of cushioning inserts having one or more customized cutouts. The return mailer container may further comprise an interview guide having a set of instructions and interview prompts for typographic, video or photo assignments.

In one or more embodiment of the present invention, the return mailer container further comprises a series of instructional labels on one or more panels of the return mailer container to provide instructions on proper use of the research kit.

The one or more opaque envelopes may be sealed with an identifying label. In one or more embodiment of the present invention, the identifying label of the one or more opaque envelopes may be sequentially labelled, or may include differentiating graphics, iconography or distinctive coloration.

In one or more embodiment of the present invention, the one or more opaque envelopes may contain a series of devices that are presented to separate study participants in a randomized order.

In one or more embodiment of the present invention, the ethnographic research kit may further comprise a personal diary, one or more rating/survey instruments, or a set of one or more cards for sorting exercises.

In a second aspect of the present invention, a method for preparing a remote ethnographic research kit is disclosed comprising accessing an online research application; electronically signing a confidentiality agreement and study consent form to initiate shipment of a research kit to a study participant; assigning a unique outbound tracking number and inbound tracking number to each study participant; adding pre-paid postage label to a return mailer container; recording the unique outbound and inbound tracking numbers associated with the study participant; applying instructional labels to a return mailer container; inserting the tablet/phone stand and return shipping supplies into the return mailer container; placing testing samples into one or more opaque envelope; temporarily sealing the return mail container with an identification label; placing the sealed return mail container into an outer shipping container; labeling the outer shipping container with name and postal address of the study participant; sealing the outer shipping container with packaging tape; and mailing the kit to the study participant.

In a third aspect of the present invention, a method for using the remote ethnographic research kit is disclosed comprising: opening the outer shipping container to view instructional label; opening the temporary closure label on the return mailer container; accessing the interview guide and one or more opaque envelope from one or more series of protective cushioning inserts having one or more customized cutouts to receive a set of study instructions; opening one or more opaque envelope to access one or more test devices; positioning the tablet/smart phone stand on the camera positioning stickers attached to the outer shipping container; making a series of photographic or video journals using the test devices; returning each test device to the one or more respective opaque envelopes and sealing the one or more opaque envelopes; replacing the one or more opaque envelopes and interview guide into the appropriate customized cutouts in the protective cushioning inserts; removing packaging supplies from the return mailer container; sealing the return mailer container; shipping the return mailer container to a research facility; initiating a honoraria payment to the study participant upon receipt of the return mailer container to the research facility.

In one or more embodiment of the present invention, the step of opening one or more opaque envelope occurs in a randomized pattern. In one or more embodiment of the present invention, the step of opening one or more opaque envelope occurs in a sequential numeric pattern.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Aspects of the present invention provide solutions which address the challenges of different current approaches including facility based research and ethnographic research to allow for more meaningful data collection to support medical device development efforts. According to one or more embodiments of the invention, a mail-out, mail-back research kit is provided that can be used to conduct ethnographic or other types of research whenever the subject is located.

This kit is intended for use with patients, caregivers, and clinicians to better understand user needs. Although exemplary embodiments of the present application are described for medical research, it is envisioned that the invention may be extended to other research fields or "verticals." In one or more embodiments, the present invention is paired with a tablet or smartphone based research platform so users can provide photographic, audio, typographic, or video data to researchers.

Embodiments of a first aspect of the invention are directed to a ethnographic research kit comprising an outer shipping container for outbound shipping to the participant; tracking information to track delivery of the outbound package from the researchers to the participants is placed on the exterior of the outer shipping container; camera positioning stickers are also attached to the outer shipping container for placing a tablet or smartphone stand to facilitate better video quality; and an return mailer container, which is utilized to return the used kit to a designated research facility, is placed within the outer shipping container. A second set of tracking information which is used to track delivery of the return mailer container from the participants to the researchers is placed on the exterior of the return mailer container.

Figure 1:
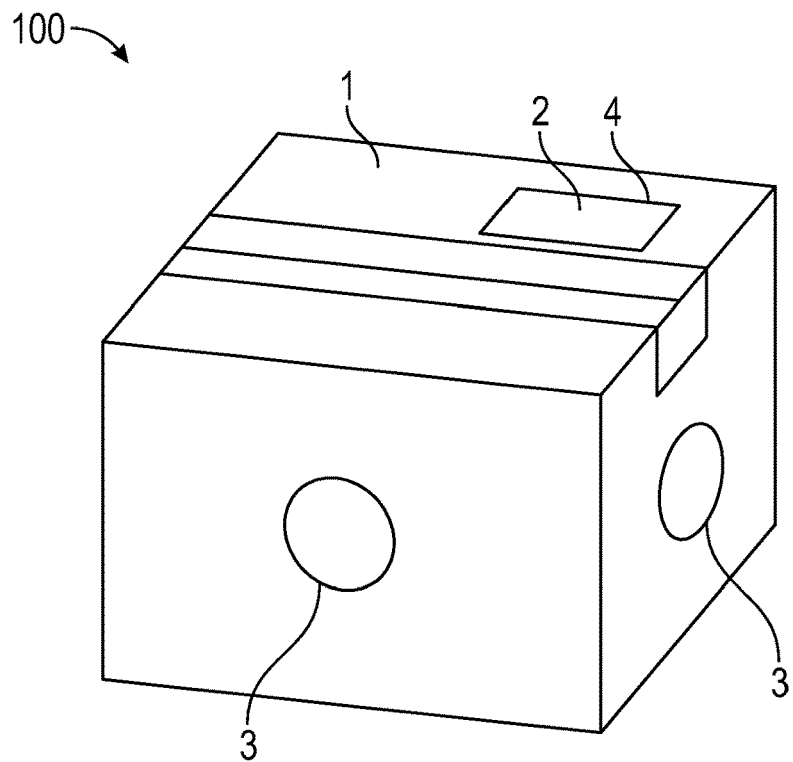
FIG. 1 shows an embodiment of the outer shipping container of the research kit.

As shown in FIG. 1, the research kit 100 comprises an outer shipping container 1 for outbound shipping from the researcher and/or research facility to the study participant with attached tracking information 2 to track delivery of the outbound package from the researchers to the study participants. In one or more embodiments, camera positioning stickers 3 are attached to the outer shipping container on each side of the cube allowing a computer tablet stand or smartphone stand to be placed in an elevated position to facilitate better video quality. For example, the outer shipping container with camera positioning stickers 3 allows a tablet or smartphone stand to be raised off furniture or other surfaces allowing the study participant to record an unobstructed video of a desired study activity. In one or more embodiments, the tracking information includes a barcode or anonymous randomly generated identification code to identify the study participant. In one or more embodiments, the tracking information 2 may be used by the researcher to track the status of the in transit package to the participant. In one or more embodiments, the tracking information 2 may be used by the researcher to determine when the package is received by the participant.

Figure 2A:
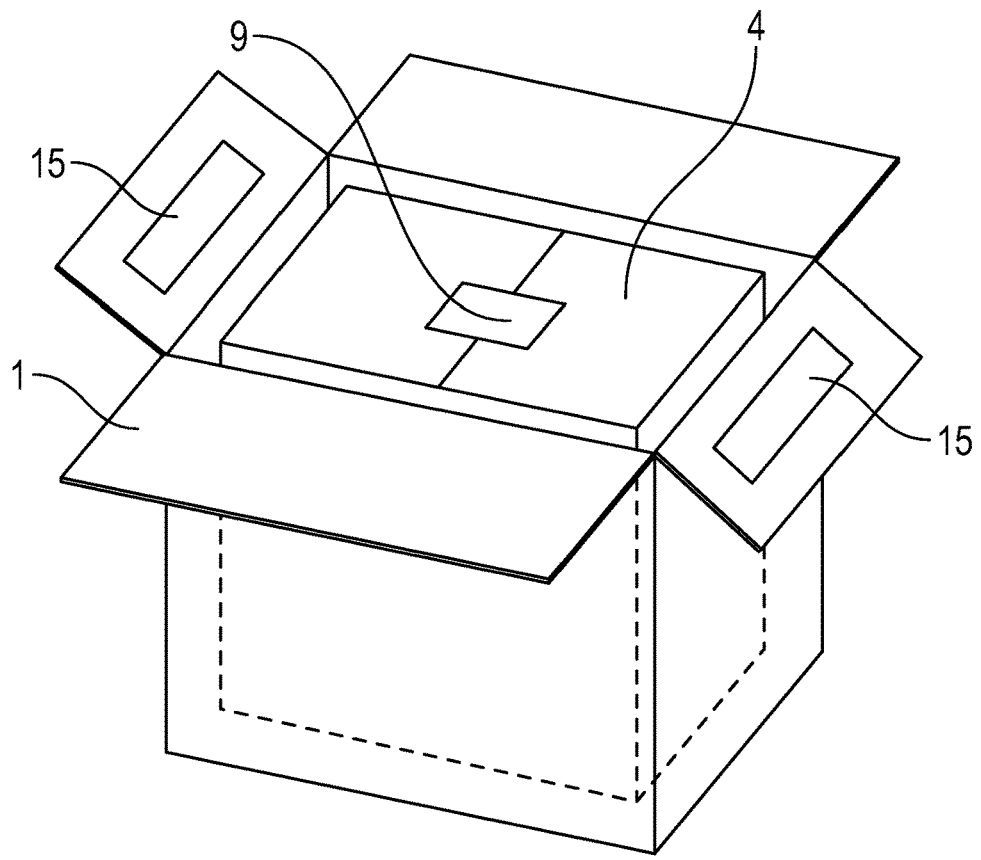
FIG. 2a shows an embodiment of a series of instructional labels attached to the flaps of the outer shipping container, and the return mailer contained as a participant would receive it within the outer shipping container.

As shown in FIG. 2a, the research kit also comprises a return mailer container 4 whose size is dimensioned to be placed within the outer shipping container 1 for shipment to the study participant. As shown in FIG. 2a, in one or more embodiments of the present invention, a series of instructional labels 15 are attached to the flaps of the outer shipping container 1. The instructional labels 15 are designed to provide the study participants with instructions on proper use of the research kit. After the completion of all tasks assigned to the study participant, the study participant may utilize the return mailer container 4 to return the used kit to the researcher or research facility. As shown in FIG. 2a, the return mailer container 4 is initially sealed with packaging tape 9 when it is provided to the study participant.

Figure 2B:
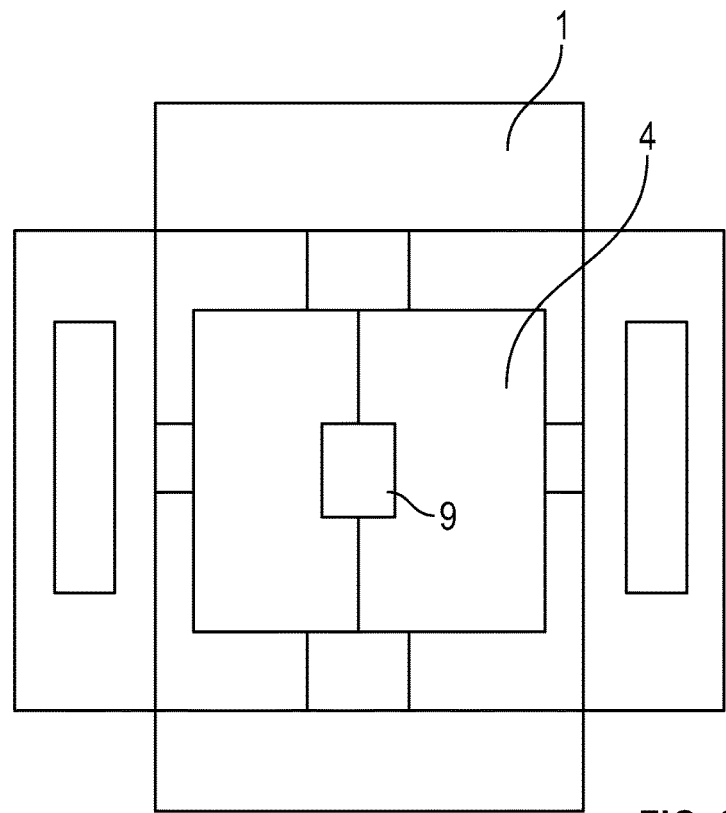
FIG. 2b shows a top view of an embodiment of a series of instructional labels attached to the flaps of the outer shipping container, and the sealed return mailer contained as a participant would receive it within the outer shipping container.

FIG. 2b shows a top view of an embodiment of a series of instructional labels 15 attached to the flaps of the outer shipping container 1, and the return mailer 4 within the outer shipping container 1 is initially sealed with packaging tape 9 when a study participant receives it.

Figure 2C:
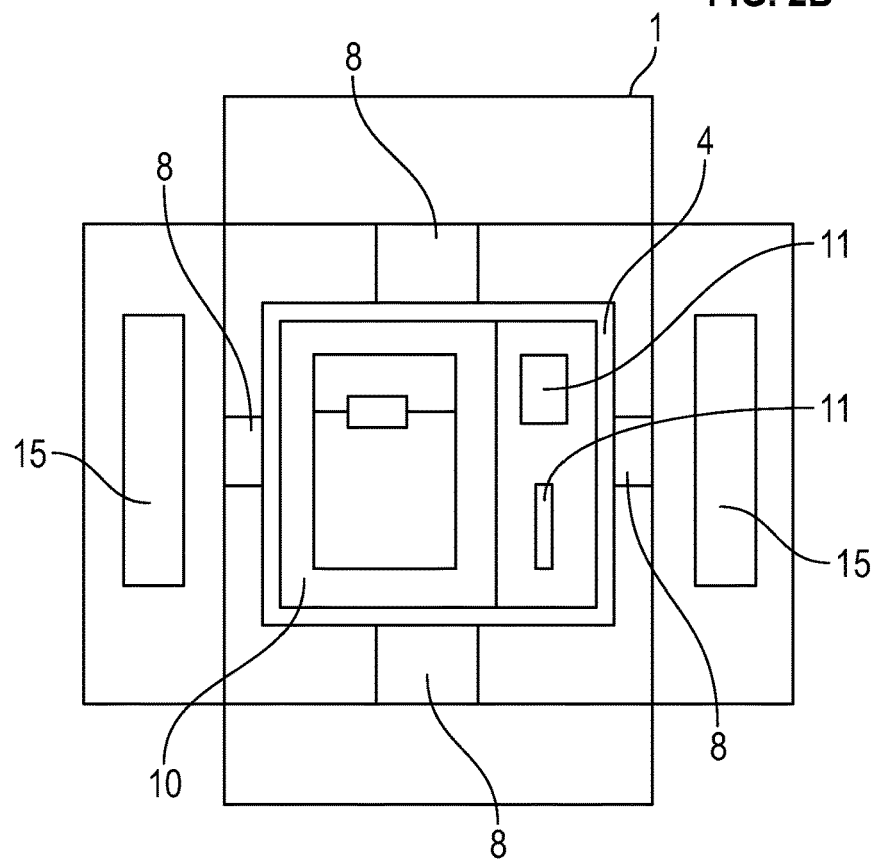
FIG. 2c shows a top view of an embodiment of a series of instructional labels attached to the flaps of the outer shipping container, and the opened return mailer with foam insert, tablet stand, and instructional booklet, and plurality of sealed opaque envelopes.

FIG. 2c shows a top view of an embodiment of a series of instructional labels 15 attached to the flaps of the outer shipping container 1, and the opened return mailer with cushioning inserts 10 with customized cutouts 11, tablet stand 12, foam spacers 8, instructional booklet, and a plurality of sealed opaque envelopes.

Figure 3:
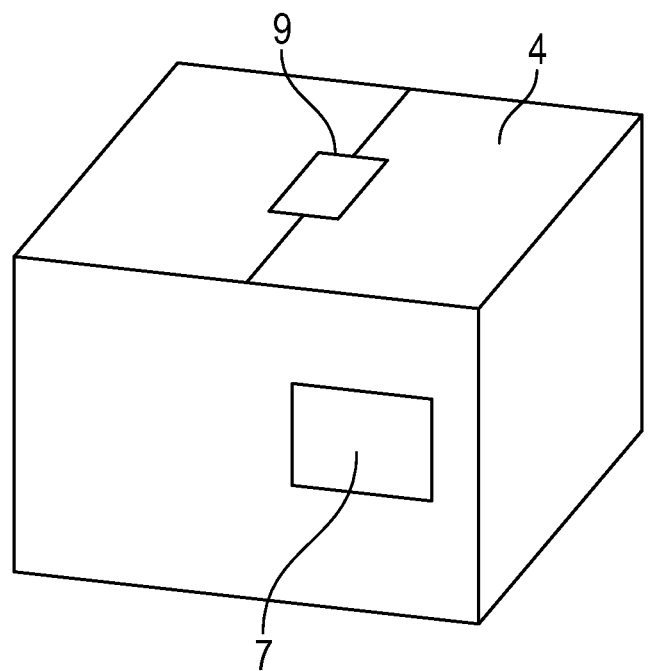
FIG. 3 shows an embodiment of a return mailer container, having identification stickers, presented as a participant would receive it.

As shown in FIG. 3, the return mailer container 4 may be sealed with a temporary closure label 9 to hold the return mailer container 4 closed until study participants are instructed to use it. In one or more embodiments, the exterior of the inner mailer or return mailer container of the ethnographic research kit may be sealed in a manner that indicates whether the kit has been opened. For example, the ethnographic research kit may be bagged, pouched, sealed in shrink-wrap, taped or enclosed in a sealed container that must be broken to open the research kit.

In one or more embodiments, as shown in FIG. 3, the return mailer container 4 may also contain content identification stickers 7 to inform the postal or delivery service of the nature of the contents of the research kit (for example, fragile, liquid contents, etc.). In one or more embodiments, the return mailer container 4 may also contain return shipping supplies to facilitate the return of the used kit to the researcher or research facility.

Figure 4:
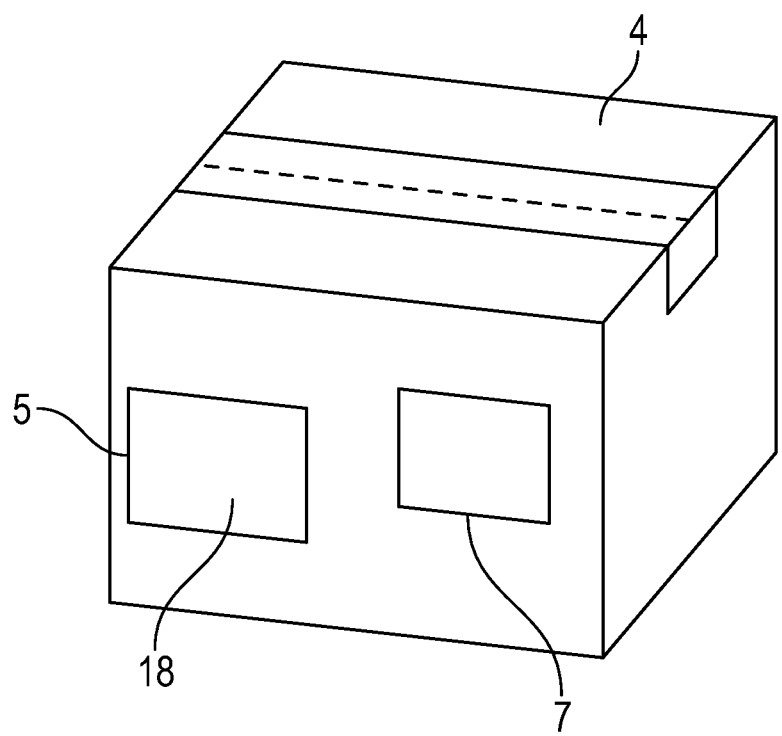
FIG. 4 shows an embodiment of a return mailer container sealed by the participant after having identification stickers and return mailing and tracking information.

In one or more embodiments, the return mailer container 4 may include prepaid postage 5 to facilitate the return of the package for the study participant after the study is complete. FIG. 4 shows the return mailer container of the ethnographic research kit that includes prepaid postage 5 and the return address of the market research facility that will collect the user's video clips and test materials.

In one or more embodiments, as shown in FIG. 4, the return mailer container 4 may also contain tracking information 18. In one or more embodiments, the tracking information 18 may be used by the researcher to track the status of the return package. In one or more embodiments, the tracking information 18 may be also used by the researcher to track when the research kit is returned to the research team or research facility. In one or more embodiments, as the return mailer container 4 may be difficult to remove from the outer shipping container 1 if the boxes are designed to nest tightly, foam spacers 8 are provided to ease removal of the return mailer container 4 which is placed in the outer shipping container 1. Foam spacers 8 may also be utilized to cushion the contents of the outer shipping container 1 or return mailer container 4.

Figure 5:
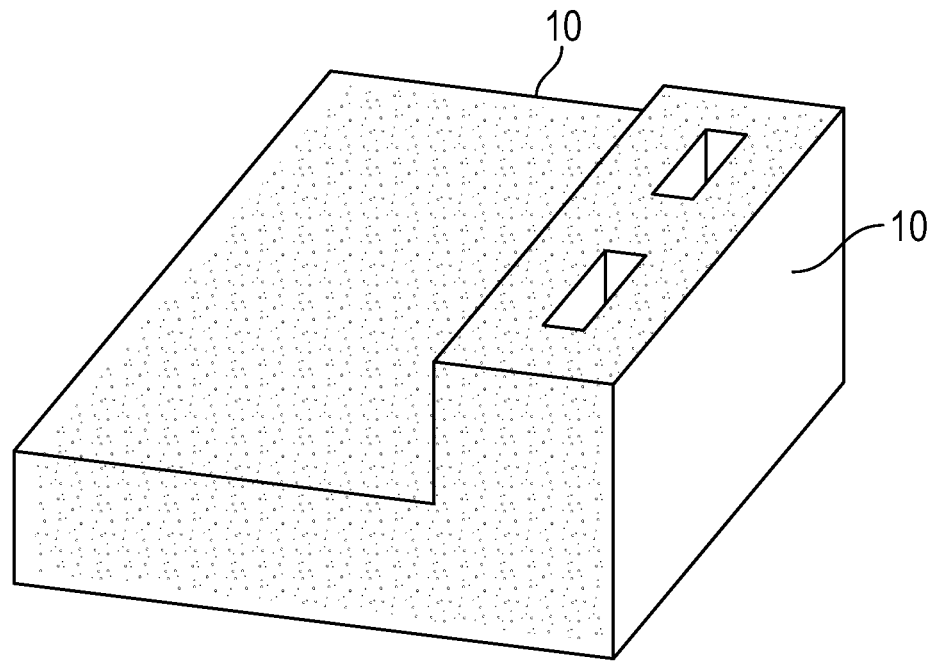
FIG. 5 shows an embodiment of a cushioning insert with customized cutouts.
Figure 6:
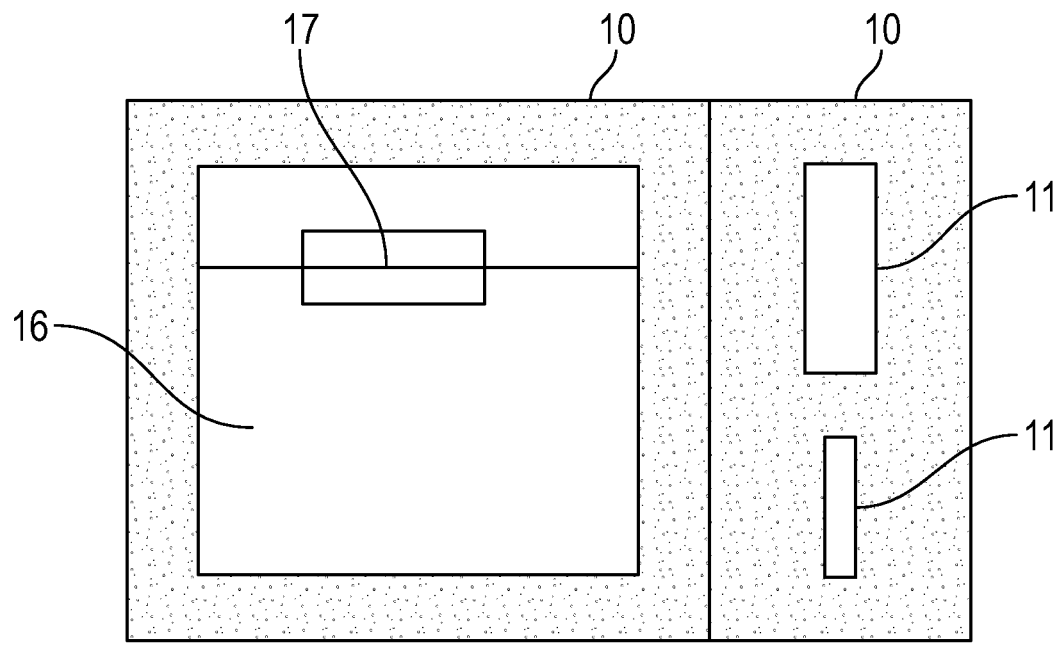
FIG. 6 shows a top view of an embodiment of a cushioning insert with customized cutouts and supporting a plurality of opaque envelopes with identifying labels.
Figure 7:
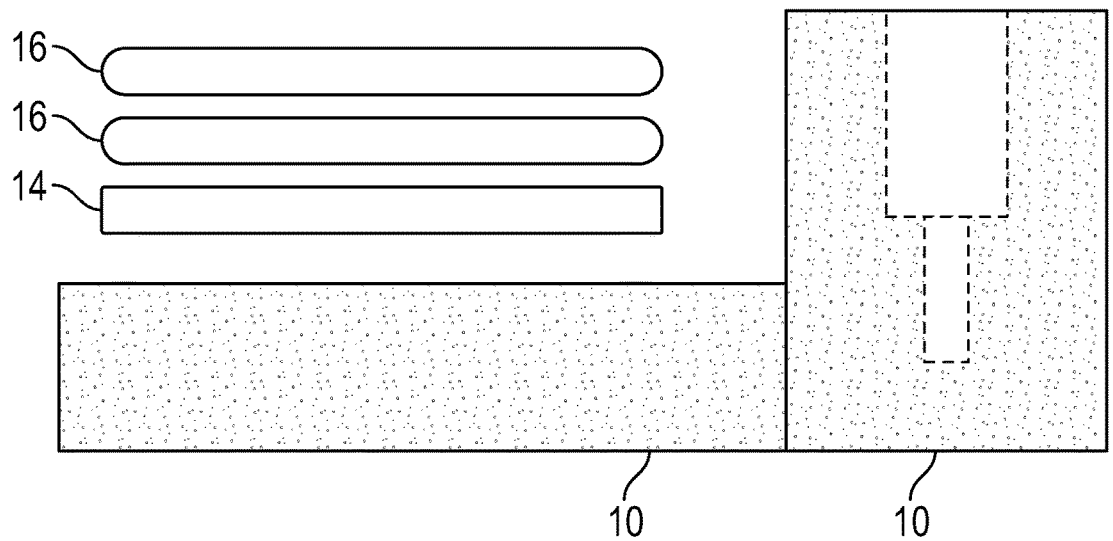
FIG. 7 shows a cross sectional view of an embodiment of a cushioning insert with customized cutouts and supporting a plurality of opaque envelopes with identifying labels.

In one or more embodiments, as shown in FIGS. 5 to 7, the return mailer container 4 includes a series of cushioning inserts 10 with customized cutouts 11 designed to securely and conveniently hold one or more of the contents of the research kit components during transit or storage. The customized cutouts 11 may also be utilized to protect the contents of the outer shipping container 1 or return mailer container from damage.

Figure 9:
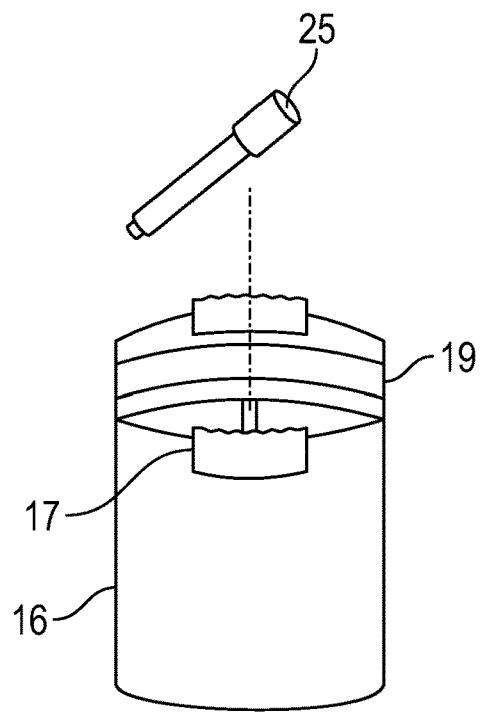
FIG. 9 shows an embodiment of a research device and an opaque, sealed envelope with an identifying label.

In one or more embodiments, as shown in FIGS. 6 and 9, the one or more opaque, sealed envelopes 16 are respectively sealed with an identifying label 17 that allows the study participants to distinguish between multiple envelopes (if present) and identify which one to open based on the research approach or desire of the moderator.

In one or more embodiments, as shown in FIG. 7, the research kit also contains one or more opaque, sealed envelopes 16 that are padded for additional protection. Each respective opaque, sealed envelope 16 contain one or more research devices or samples. Packaging supplies 14 are also provided for ease of returning the used research kit back to the researchers or research facility.

Figure 8:
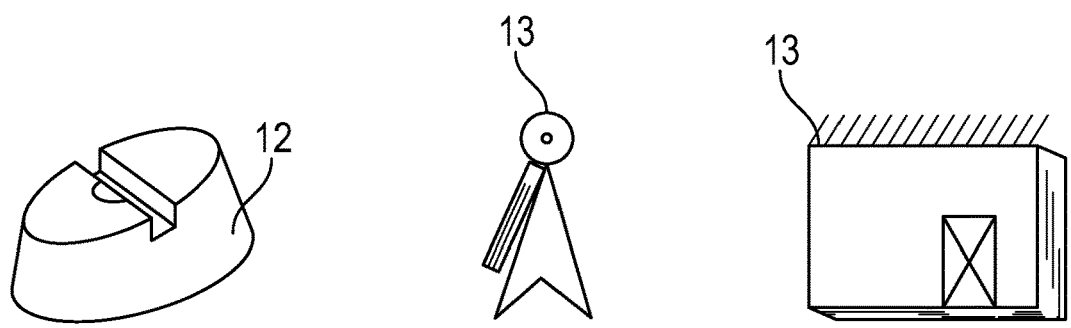
FIG. 8 shows an embodiment of a tablet or smartphone stand and interview guide.

As shown in FIG. 8, one or more embodiments of the research kit may include a tablet/smartphone stand 12 to allow the study participant to record consistent, hands-free, shake-free video footage as required by the research study. As also shown in FIG. 8, one or more embodiments of the research kit may include an instruction manual or interview guide 13. The terms "interview guide" and "instruction manual" are used herein interchangeably. In one or more embodiments, interview guide 13 includes a set of instructions and interview prompts for the study participants to complete desired video or photo assignments. In one or more embodiments, the instruction manual includes instructions for using the kit to obtain a video clip and for sending the video clip to the researcher for collection and processing of the data. In one or more embodiments, the instruction manual also includes instructions for obtaining payment for participation.

FIG. 9 shows an embodiment of a research device 25 of interest which is placed in an opaque, sealed envelope 16 with an identifying label 17. The opaque, sealed envelope 16 may be sealed with a temporary closure label, e.g. re-sealable sticker 19, which may be used to re-seal the opaque pouch. Upon completion of a research activity, the research device 25 may be placed back into the designated opaque envelope 16 and re-sealed with re-sealable sticker 19.

Figure 10:
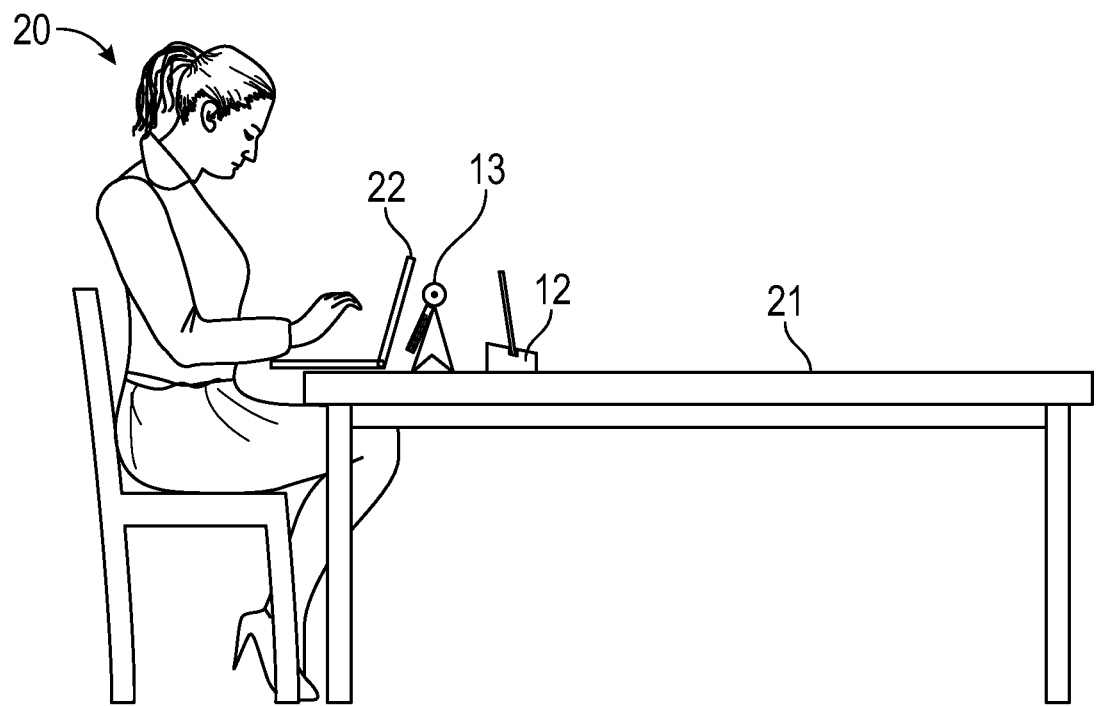
FIG. 10 shows a side view representation of a research participant with the components of the research kit and mobile application being used to conduct research activities.

FIG. 10 shows a side view representation of a research participant 20 seated at table 21 with the components of the research kit including tablet/smartphone stand 12, instruction manual or interview guide 13 and mobile application 22 being used to conduct research activities and to allow the study participant to record consistent, hands-free, shake-free video footage as required by the research study.

Figure 11:
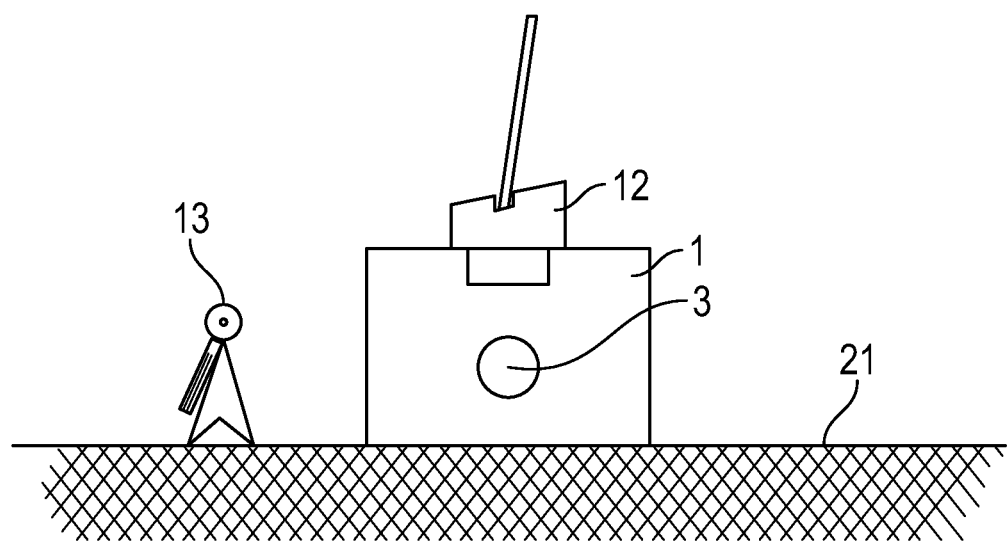
FIG. 11 shows a side view representation of an alternative embodiment, whereby the outer mailer is being used to support the tablet stand while conducting research activities.

FIG. 11 shows a side view representation of an alternative embodiment, whereby the outer shipping container 1 is being used to support the tablet stand 12 on a table 21 while conducting research activities. As shown, instruction manual or interview guide 13 may also be placed on table 21 to allow the research participant to conduct the desired research activity in an unobstructed manner while recording any desired video and audio footage in a hands-free manner.

Embodiments of a second aspect of the invention are directed to methods of conducting remote ethnographic research using the research kit 100 disclosed herein.

In one or more embodiments, study participant 20 may access the research tool/application, and electronically sign a confidentiality agreement, study consent form, and other enrollment materials as may be required. This event triggers creation and shipment of a research kit 100 for that participant. The research tool/application may be accessible, for example, on a web page displayed by a web browser on a computing device, such as a personal computer. Alternatively, the research tool/application may be accessible using a smartphone or tablet device. Logging into the system and completing the online enrollment materials triggers the creation and shipment of a research kit and mailing package when the research tool, including an online webpage or web-based application and mailback kit are used together.

Upon execution of the confidentiality agreement and study consent form, a personalized return mailer container is prepared for the study participant including prepaying postage, recording the unique outbound tracking number 6 associated with the participant's outbound shipping container 1 and unique return mailer 4 tracking information 18 associated with the participant's return mailer package 4 respectively, applying the instructional labels 15, and inserting the tablet/smartphone stand 12 and return shipping supplies within the return mailer container 4.

One or more test devices 25 are placed into the appropriate one or more opaque envelopes 16 according to the study design. In one or more embodiments, devices may be placed into the opaque envelopes 16 in a predetermined randomized order or pattern according to the study design. In one or more embodiments, the opaque envelopes 16 are temporarily sealed using the appropriate identifying label 17. In one or more embodiments, the opaque envelopes 16 are sequentially numbered or lettered using the appropriate identifying labels 17. In one or more embodiments, the opaque envelopes 16 are otherwise differentiated from each other using graphics or iconography contained on the appropriate identifying labels 17. In one or more embodiments, the opaque envelopes 16 are otherwise differentiated from each other through use of distinctive coloration. The opaque envelopes 16 are then placed into the return mailer container of the research kit.

The return mailer container 4 is sealed with a temporary closure label 19 thereby sealing the "inside" flaps and protecting the return shipping label.

In one or more embodiments, the return mailer container 4 is placed in the outer shipping container and centered within the outer shipping container using interspersing foam spacers 8 if necessary.

In one or more embodiments, the outer shipping container 1 is labeled with the recipient's name and addressed and sealed with packaging tape 9. The outbound tracking information 2 and return tracking information 18 are recorded, and the research kit is mailed to the study participant (and tracked if necessary).

In one or more embodiments, the research kit 100 is used with a research tool to aggregate data provided by the participant and to facilitate follow-up discussion by the moderator. When the study participant receives the research kit 100, the study participant 20 follows the instructions in the research tool to open the outer shipping container 1 and then break the temporary closure label 9 on the inner return mailer 4. The research tool also gives the respondent an overview of how the research kit works and provides an introduction to the different kit components.

The study participant uses the research kit components to execute the study agenda. In one or more embodiments, the study participant is instructed to make a series of photographic or video journals using the test devices, tablet/phone stand, and the camera feature of a tablet or smartphone device. In one or more embodiments, the series of photographic or video journals include taking videos of opening the packaging or applying a research device to the participant's body, simulating use of the device, disposing of a device, or storing or traveling with a prospective device of interest. Once the user has obtained a video clip and or completed the tasks assigned, the research items are placed in the return mailer container. In one or more embodiments, the series of photographic or video journals include taking videos of their current practices related to the study subject to provide researchers context. In one or more embodiments, participants include providing written or typed responses to moderators' questions or prompts provided in the interview guide 13. In one or more embodiments, the series of photographic or video journals is made in response to an ad hoc request from the moderator apart from the activities enumerated in the interview guide 13. In one or more embodiments, the typographic response, video clip, photograph or audio clip may be uploaded as a media file via a secure portal to enable access by the researcher. The media file containing the response may also be sent to the researcher by electronic mail, text messaging, or other electronic delivery arrangements. A media file, which can be a video clip of a participant interview, a photograph taken as part of a participant interview, or an audio recording of a participant interview are recorded by the participant.

Upon completion of the study, the participants are instructed to return each device 25 to the respective opaque envelope 16 and seal the padded packages closed with re-sealable sticker 19 by removing the strip covering the adhesive or by using the packaging supplies 14.

The sealed opaque envelopes 16 and interview guide 13 are placed back into the appropriate customized cutouts 11 in the protective cushioning inserts 10. In one or more embodiments, the participant may be allowed to keep the tablet/smartphone stand 12.

The study participants are instructed to remove the enclosed packaging supplies from the bag and to seal the return mailer container 4 closed, with the prepaid return label and tracking information 18 being visible for shipping.

The study participant is instructed to return the research kit to the researcher or research facility by dropping the return mailer container 4 off at the post office or having a delivery service pick up the research kit. The sealed return mailer container is sent to a research facility for data compilation, analysis, and testing as required. The location and delivery status of the research kit can be tracked using tracking information 18 recorded earlier.

When the research kit is received back by the research team, the issuance of a honoraria payment to the study participant is initiated for participating in the study.

The research kit of the present invention is extremely flexible and can take a variety of embodiments.

For example, in one or more embodiments, a different form of opaque packaging, such as a small cardboard box or other outer wrapping material, can replace the opaque envelope. In one or more embodiments, the outer wrapping material allows for evaluation of devices in various box or package designs, and study of storage and travel practices.

In one or more embodiments wherein the research kit or one or more of the study device contain a liquid, the research kit may include a protective opaque container that conforms to applicable postal regulations and is designed to contain potential breakage or leakage of liquids in vials, cartridges, or other containers used during the research before study participants see them, taking the place of the opaque packaging. If the study topic includes liquids, the kit can contain a protective return container that conforms to applicable postal regulations and is designed to contain potential breakage and absorb any potential leakage of liquids in vials, cartridges, or other containers used during the research.

In one or more embodiments, the opaque envelopes may contain a series of devices that are presented to separate study participants in a randomized order (e.g., using a Latin Squares randomization), to provide a balanced exposure to devices and eliminate order-of-presentation effects or other potential sources of bias In one or more embodiments, a small sharps collector or needle clipper may be included if sharp devices are supplied for testing.

In one or more embodiments, the research kit could contain one or more medical delivery devices such as a simulated injection pad, injection site, or other medical delivery components.

In one or more embodiments, research kit may also contain ancillary items such as instructions, proposed packaging, alcohol swabs, gloves, or the like, which may also be tested in the actual use environment.

In one or more embodiments, the research kit and the opaque envelopes may also contain a variety of instructional variations for testing with the device held constant.

In one or more embodiments, the study design requires that not every opaque envelope will be opened by every study participant. For example, a study participant could receive envelopes numbered 1-6 inclusive, but based on the progression of the research dialogue, the study participant will be instructed to open only the envelopes numbered "1", "2", and "4", leaving envelopes numbered "3", "5", and "6" intentionally unopened by that participant.

In one or more embodiments, the research kit may include a diary or other notebook completed by the study participant to record certain items on paper and return this diary with the research kit contents at the conclusion of the study.

In one or more embodiments, the research kit may include a series of preprinted cards for card sorts or other exercises to understand perception of different devices or underlying beliefs.

In one or more embodiments, the research kit may include workmats or rating schemes (eg, Likert or Visual Analog Scale) or other materials for the study participant to collect data associated with traditional qualitative or quantitative survey or research instruments.

The present invention provides several advantages over currently known techniques. Through the use of the research kit of the present invention, researchers gain a rich, immersive experience into the user's experience and interaction with the research subject. If storage is a concern, researchers can design interview components that have the user take prospective packaging into different spaces in the home. Due to the remote aspect of the research kit, prototypes of devices of interest can be studied as part of the study participant's daily routine, such as commuting or traveling, that are impossible to adequately study relying solely on conventional research techniques. By collecting research results in the environment of interest, the research kit of the present invention allows for the collection of numerous sources of information including, but not limited to, sound, noise, ambient lighting, distractions, and the like, which are impossible to collect with conventional techniques.

Another advantage of the research kit of the present invention is that study participants are more relaxed by being in one's home, office, or clinical environment, as opposed to a research facility with cameras, recorders, or one-way glass which is inherently more comfortable for study participants. Because they are less apprehensive, the information that researchers collect via the research kit of the present invention is more accurate and complete than information which can be gathered using traditional research techniques.

Another advantage of the research kit of the present invention is that study participants will have all the materials required for the study on hand, and are guided to collect them by the study materials. Participants have access to all the items that they "typically" use in their process and can share them with the researchers via guided instruction provided. Therefore, study participants are able to complete study activities at home at a time that is convenient for them, and can accommodate the research activities of interest. This flexibility allows study participants to overcome time constraints and scheduling conflicts that may be posed by shift work, distance, travel considerations and other issues involved with attending in-person studies during specified hours of operation of a research facility.

Though conducted remotely, interviews conducted using the research kit of the present invention are still guided. The present invention combines the desirable aspects of guided, structured interviews common in in-person research while allowing study participants to feel comfortable by being in their own normal environment and not under explicit "observation" and also preserving the ability to follow up and probe with study participants.

Use of the research kit of the present invention allows for research of sensitive or personal topics. Study participants may be unwilling to share information explicitly with a researcher in a facility that can be passively observed through remote research. Study participants may be more willing to discuss sensitive topics in their normal environment, where they are not being "watched" in real time by observers behind the mirror.

Use of the research kit of the present invention also allows for more privacy for participants and researchers. In one or more embodiments of the present invention, explicit instructions are provided for study participants not to show their faces, and graphic diagrams are provided on how to capture a properly framed camera shot to accomplish same. This feature of the research kit further reduces the anxiety of participants and increased openness of participant response,] and helps researchers collect data in a way that does not require additional processing to protect privacy later, as is common with other in-person research techniques As a result, use of the research kit of the present invention allows for a wider, more representative population. In person research is limited by the ability of study participants to leave home and participate at a facility, and be near a facility to participate. The research kit of the present invention allows study participants to actively participate from a remote location thereby allowing a wider group of participants to be recruited who may not normally participate in traditional in-person studies, but who are included in the target user population. It also allows for observation of a wider range of behaviors. It allows for the study of conditions that occur solely within participant populations that would be entirely precluded from in-person research.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1: "Parallel Path" Exploration

Figure 12:
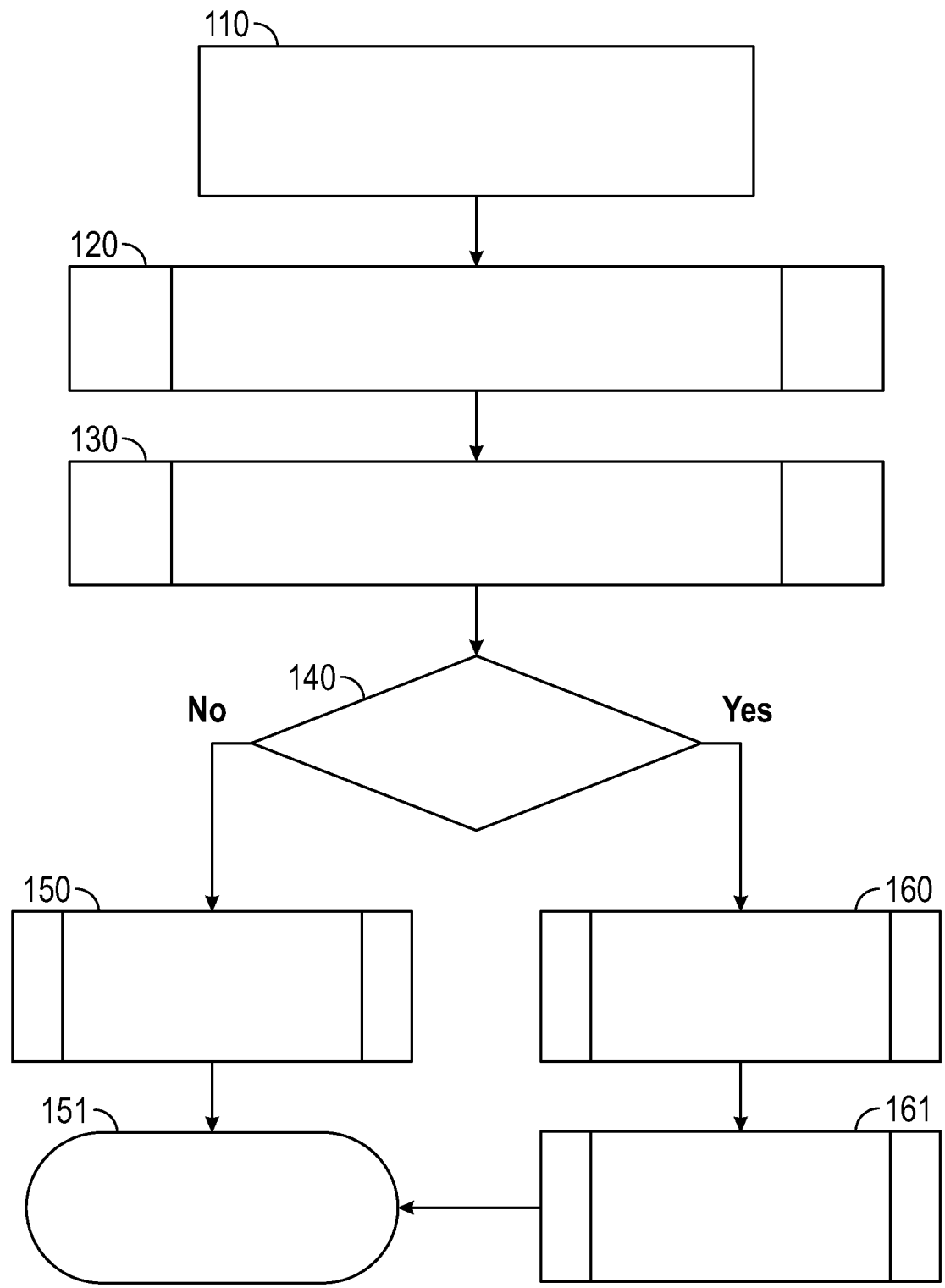
FIG. 12 shows a flowchart depicting one embodiment of a research process.

An embodiment incorporating a "Parallel Path" Exploration is shown in FIG. 12. As shown in FIG. 12, in Step 110, the participant receives a package with six opaque envelopes 16 containing sample devices 25, each uniquely numerically identified as opaque envelopes "1","2", "3", "4", "5" and "6". In Step 120, the participant is instructed to open opaque envelope numerically identified as "1" and complete research activities associated with device 25 contained within opaque envelope numerically identified as "1". In Step 130, the participant is instructed to open opaque envelope numerically identified as "2" and complete research activities associated with device contained within the opaque envelope numerically identified as "2". In Step 140, a determination is made by the participant based on activities completed.

If the participant does not dislike any aspect of the device contained within opaque envelope numerically identified as "2", the participant is instructed to open opaque envelope numerically identified as "4" and complete research activities associated with device 25 contained within opaque envelope numerically identified as "4" in Step 150. After completion of step 150, the participant is instructed to re-package all studied devices 25 into the corresponding padded opaque envelopes 16 and returned to inner return mailer 4 in step 151.

If, however, in step 140, the participant does dislike any aspect of the device contained within opaque envelope numerically identified as "2", the participant is instead instructed to open opaque envelope numerically identified as "5" and complete research activities associated with device contained within opaque envelope numerically identified as "5" in Step 160. In Step 161, the participant is instructed to open opaque envelope numerically identified as "6" and complete research activities associated with device contained within opaque envelope numerically identified as "6". After completion of step 161, the participant is instructed to re-package all studied devices 25 into the corresponding padded opaque envelopes 16 and returned to inner return mailer 4 in step 151.

Example 2—"Temporary Diversion" to Address an Objection

Figure 13:
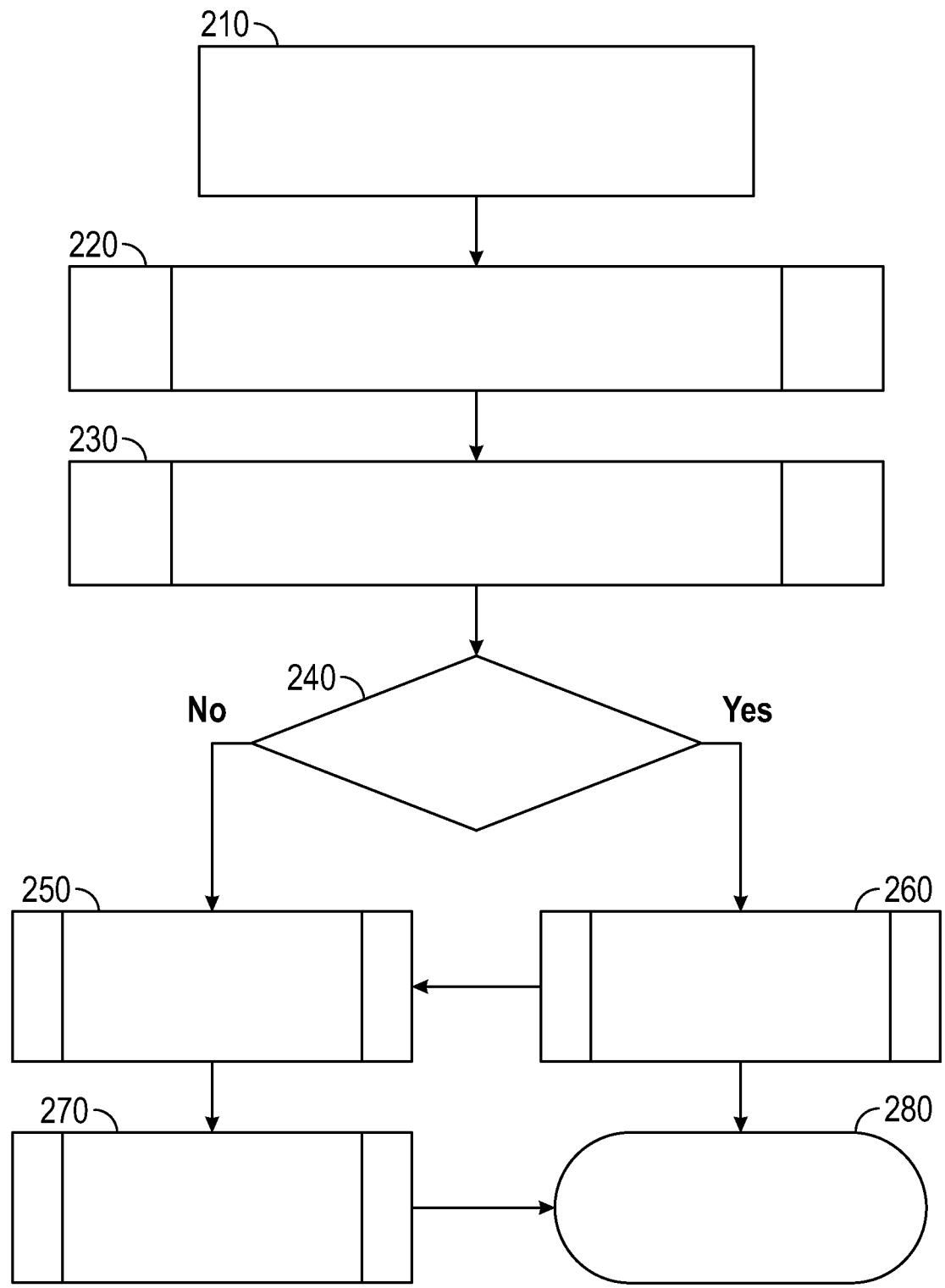
FIG. 13 shows a flowchart depicting an alternate embodiment of a research process where some opaque envelopes are opened by a participant, and others remain unopened based on the progression of research activities.

An embodiment incorporating a "temporary diversion" to address an objection to the subject device expressed by the participant is shown in FIG. 13. As shown in FIG. 13, Participant receives package with six opaque envelopes 16 containing sample devices 25, each uniquely numerically identified in Step 210 as opaque envelopes "1","2", "3", "4", "5" and "6". In Step 220, the participant is instructed to open opaque envelope numerically identified as "1" and complete research activities associated with device 25 contained within opaque envelope numerically identified as "1". Upon completion of Step 220, the participant is instructed to open opaque envelope numerically identified as "2" and complete research activities associated with device 25 contained within opaque envelope numerically identified as "2" in step 230. In Step 240, a determination is made by the participant based on activities completed in Step 230.

If the participant does not dislike any aspect of the device contained within opaque envelope numerically identified as "2", the participant is instructed to open opaque envelope numerically identified as "4" and complete research activities associated with device 25 contained within opaque envelope numerically identified as "4" in Step 250.

If, however, in step 240, the participant does dislike any aspect of the device contained within opaque envelope numerically identified as "2", the participant is instead instructed to open opaque envelope numerically identified as "5" and complete research activities associated with device 25 contained within opaque envelope numerically identified as "5" in Step 260. After the completion of Step 260, the participant is instructed to open opaque envelope numerically identified as "4" and complete research activities associated with device contained within opaque envelope numerically identified as "4" in Step 250.

After completion of step 250, the participant is instructed to open opaque envelope numerically identified as "6" and complete research activities associated with device contained within opaque envelope numerically identified as "6" in step 270.

After completion of step 270, the participant 20 is instructed to repackage all studied devices 25 into the corresponding padded opaque envelopes 16 and returned to inner return mailer 4 in step 280.

Example 3—No Online Tool

Figure 14:
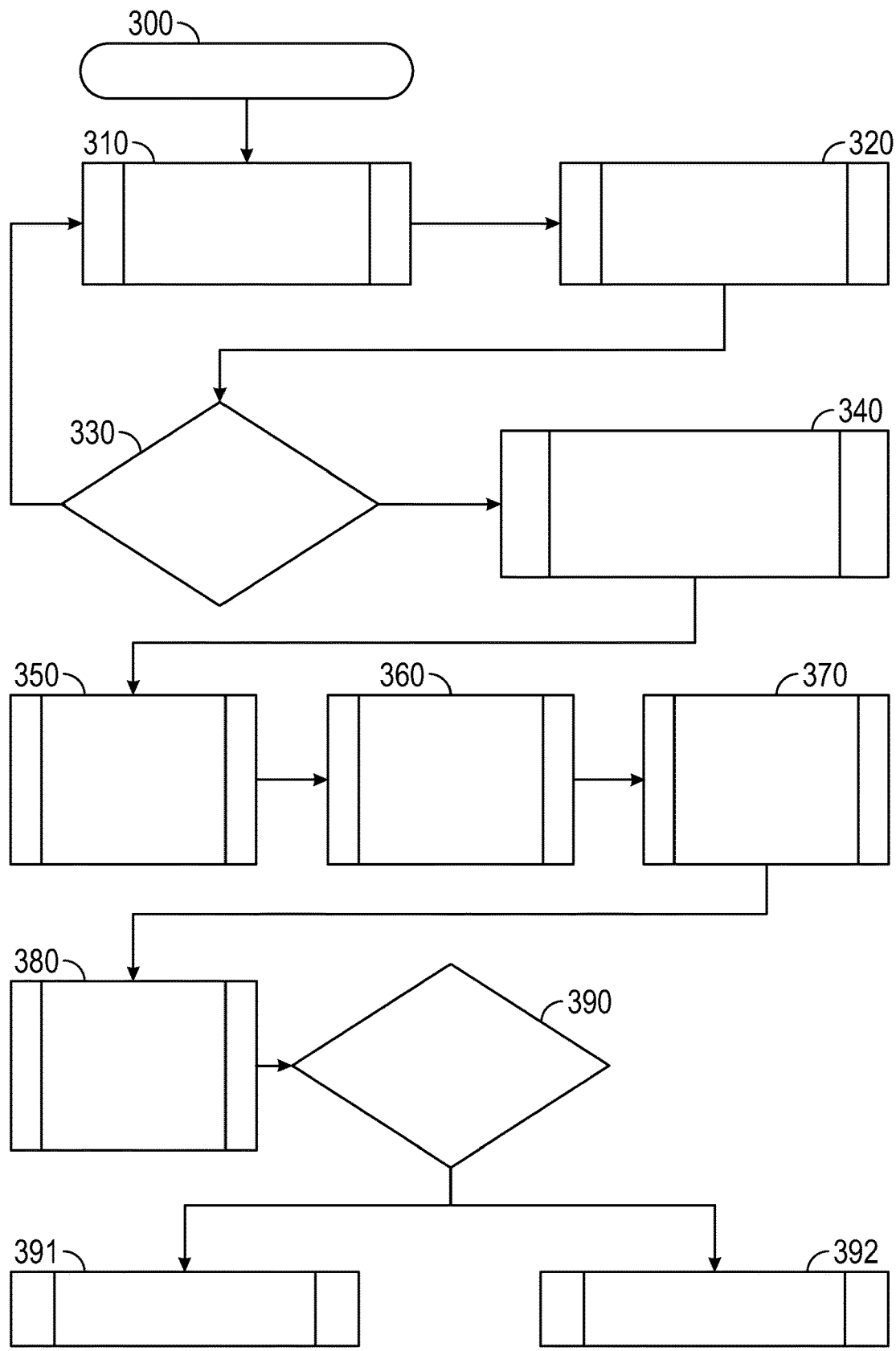
FIG. 14 shows a flowchart depicting one embodiment of a research process without using an online tool.

An embodiment without an online tool is shown in FIG. 14. As shown in FIG. 14, the participant signs confidentiality, nondisclosure, and consent agreements in Step 300. Upon completion of Step 300, a personalized research kit 100 prepared for participant 20 in Step 310. The research kit is mailed and tracked enroute to study participant in Step 320.

If the research kit is successfully received by participant in step 330, then the participant 20 receives an introduction to the contents of the research kit and an introduction to the usage of the research kit in step 340. If however the research kit is not successfully received by participant in step 330, then another personalized research kit prepared for participant in Step 310 and the replacement research kit is mailed and tracked enroute to study participant 20 in Step 320.

Upon successful completion of step 340, the participant 20 proceeds to complete assigned study activities in step 350. Upon completion of the assigned study activities in step 350, the participant repackages all materials into return mailer 4 in Step 360. In Step 370, the participant 20 mails return package 4. In Step 380, the return mailer 4 is tracked enroute to return destination. Upon the return mailer 4 being successfully received by the return destination in Step 390, the issuance of an honoraria payment check is issued to participant in step 391 for successful participation and completion of the research study. If however, the return mailer 4 is not received by the return destination in Step 390, an honoraria payment check is not issued to participant in step 392 for failure to successfully participate and complete the research study.

Example 4—With Online Tool

Figure 15:
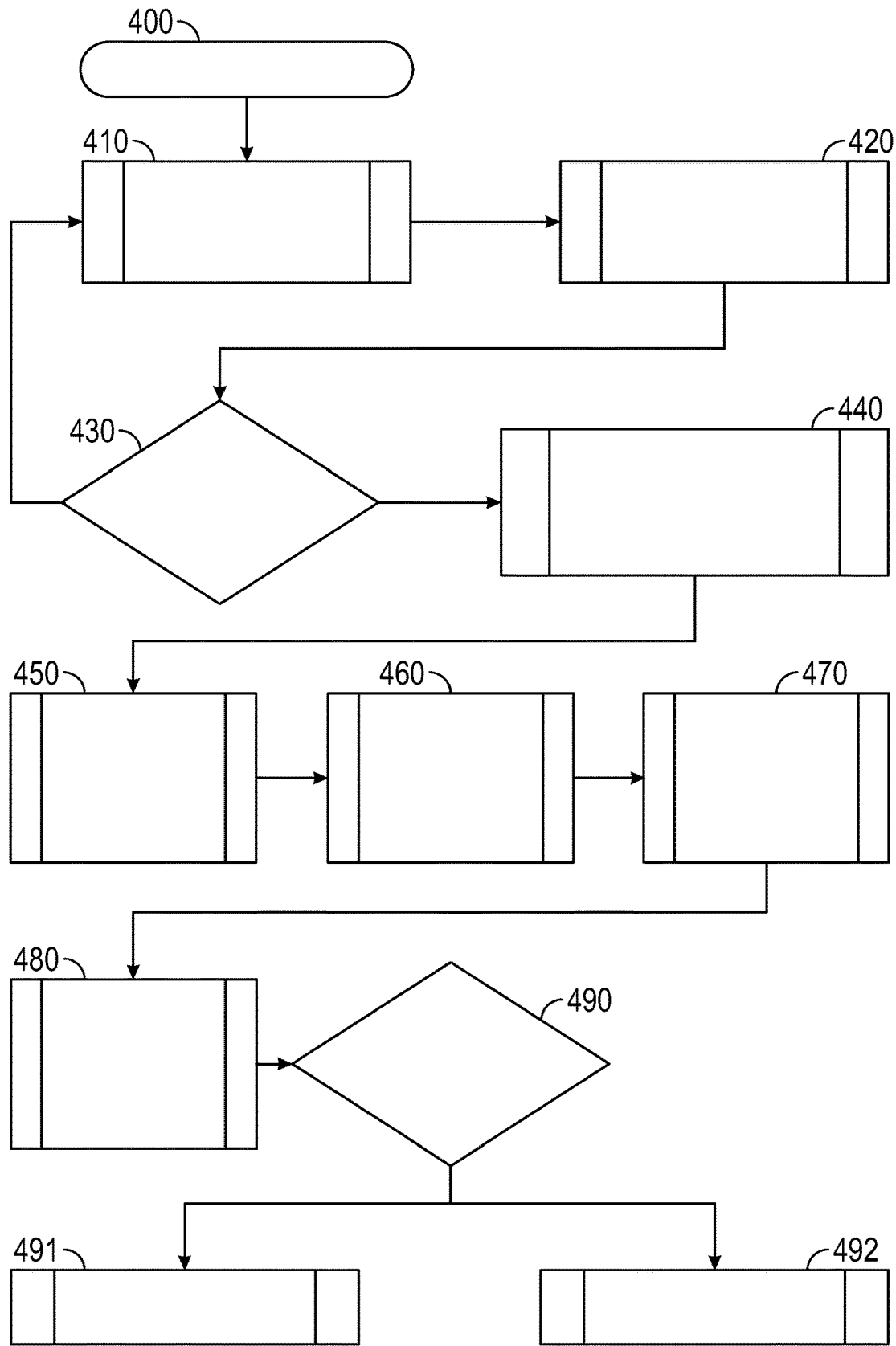
FIG. 15 shows a flowchart depicting one embodiment of a research process using an online tool.

An embodiment with an online tool is shown in FIG. 15. As shown in FIG. 15, the participant 20 signs confidentiality, nondisclosure, and consent agreements in Step 400. Upon completion of Step 400, a personalized research kit 100 prepared for participant in Step 410. The research kit is mailed and tracked enroute to study participant in Step 420.

If the research kit is successfully received by participant in step 430, then the participant receives an introduction to the contents of the research kit and an introduction to the usage of the research kit in step 440. If however the research kit is not successfully received by participant in step 430, then another personalized research kit prepared for participant in Step 410 and the replacement research kit is mailed and tracked enroute to study participant in Step 420.

Upon successful completion of step 440, the participant proceeds to complete assigned study activities using samples and an online research tool in step 450. Upon completion of the assigned study activities in step 450, the participant 20 repackages all materials into return mailer 4 in Step 460. In Step 470, the participant 20 mails return mailer 4. In Step 480, the package is tracked enroute to return destination. Upon the return mailer 4 being successfully received by the return destination in Step 490, the issuance of an honoraria payment check is issued to participant in step 491 for successful participation and completion of the research study. If however, the return mailer 4 is not received by the return destination in Step 490, an honoraria payment check is not issued to participant in step 492 for failure to successfully participate and complete the research study.

Example 5

Figure 16:
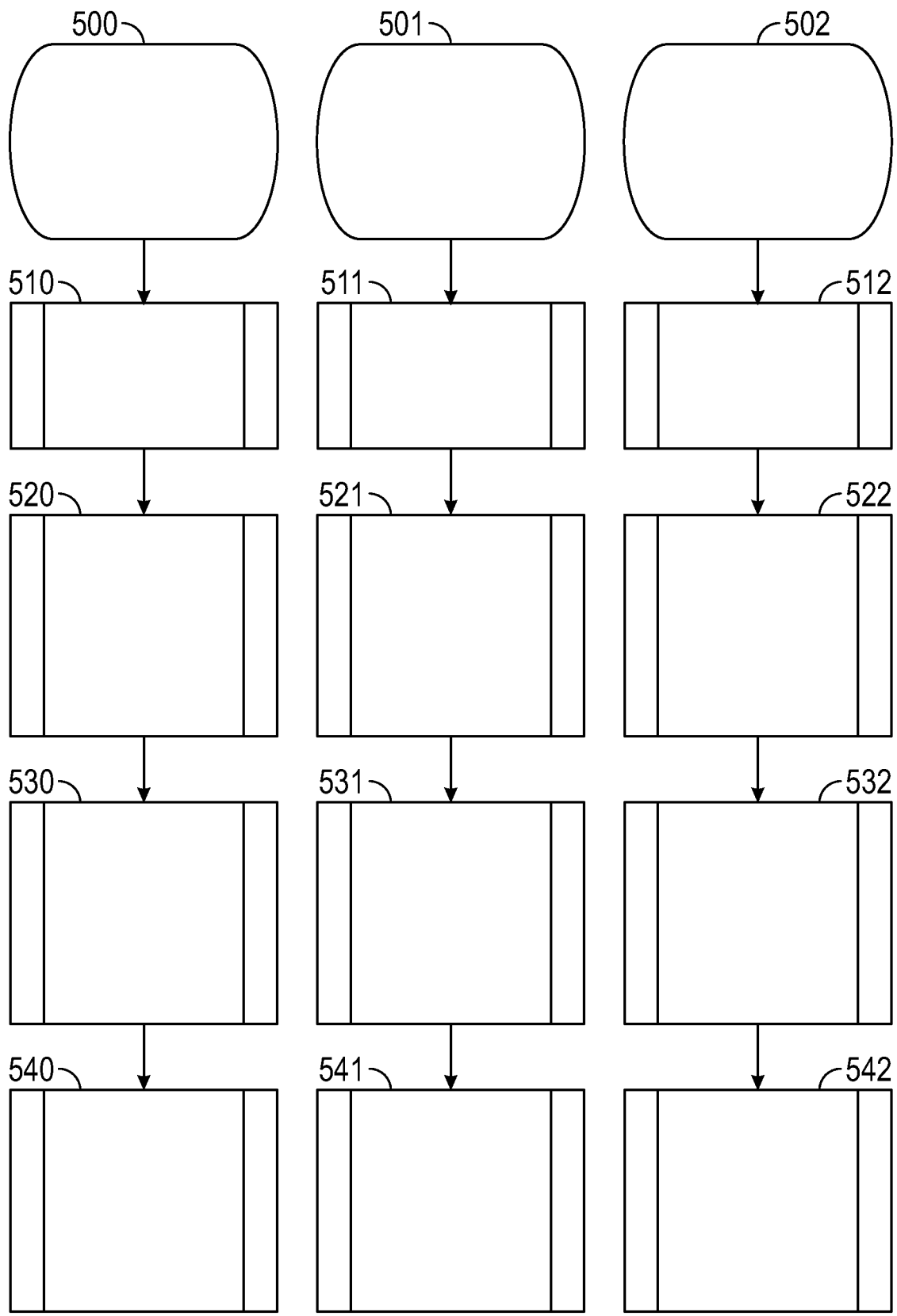
FIG. 16 shows a representative randomization schedule, whereby three participants open opaque envelopes in a specific order to minimize bias effects in the research project.

An embodiment wherein the order of the opaque envelopes 16 is randomized is shown in FIG. 16. As shown in FIG. 16, in step 501, Participant #1 executes confidentiality, nondisclosure, and consent agreements. Participant #2 executes confidentiality, nondisclosure, and consent agreements in step 502. Participant #3 executes confidentiality, nondisclosure, and consent agreements in step 503.

In Step 510, Participant #1 receives a custom research kit 100 containing three envelopes identified as envelope "A", envelope "B" and envelope "C". As shown in FIG. 16, upon receiving a custom research kit in step 510, Participant #1 is instructed to open envelope "A" and complete research activities associated with device contained within envelope A in Step 520. Upon completion of Step 520, Participant #1 is instructed to open envelope "B" and complete research activities associated with device contained within envelope B in step 530. Upon completion of Step 530, Participant #1 is instructed to open envelope "C" and complete research activities associated with device contained within envelope C in Step 540.

In Step 511, Participant #2 receives a custom research kit 100 containing three envelopes identified as envelope "A", envelope "B" and envelope "C". As shown in FIG. 16, upon receiving a custom research kit in step 511, Participant #2 is instructed to first open envelope "B" and complete research activities associated with device contained within envelope B in Step 521. Upon completion of Step 521, Participant #2 is instructed to open envelope "C" and complete research activities associated with device contained within envelope C in step 531. Upon completion of Step 531, Participant #2 is instructed to open envelope "A" and complete research activities associated with device contained within envelope "A" in Step 541.

In Step 512, Participant #3 receives a custom research kit 100 containing three envelopes identified as envelope "A", envelope "B" and envelope "C". As shown in FIG. 16, upon receiving a custom research kit in step 512, Participant #3 is instructed to open envelope "C" and complete research activities associated with device contained within envelope C in Step 522. Upon completion of Step 522, Participant #3 is instructed to open envelope "A" and complete research activities associated with device contained within envelope "A" in step 532. Upon completion of Step 532, Participant #3 is instructed to open envelope "B" and complete research activities associated with device contained within envelope B in Step 541.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of remotely conducting ethnographic research to support development of medical devices, the method comprising:
   providing a study participant access to a web-based research application via a computing device, the web-based research application permitting online enrollment by the study participant and a request for an ethnographic research study to be sent to the study participant;
   sending to the study participant a research kit including:
      an outer shipping container including package tracking information and containing one or more numbered packages containing a series of medical test devices placed in the one or more numbered packages in a pattern, the one or more numbered packages being sealed with an identifying label to identify which of the one or more numbered packages to open; and
      a return container addressed to a research facility;
   providing the study participant access to an interview guide, and providing via the web-based research application, instructions on use of the medical test devices, interview prompts for the study participant to answer questions about the series of medical test devices so that the study participant remotely provides private, guided interview feedback on the medical test devices without direct observation from an observer or a researcher;
   providing instructions to the study participant to conduct a test on the series of medical test devices including simulated use of the medical test devices;
   providing instructions to the study participant to make a series of photographic or video journals using the medical test devices using the computing device; and
   aggregating and compiling data provided by the study participant and utilizing the data provided by the study participant to complete the ethnographic research and to support the development of the medical devices.

2. The method of claim 1 further comprising recording a unique outbound tracking number and a unique inbound tracking number associated with the study participant.

3. The method of claim 2, further comprising recording the unique outbound and inbound tracking numbers associated with the study participant.

4. The method of claim 1, wherein the web-based research application provides prompts for the study participant to electronically sign a confidentiality agreement and a study consent form prior to sending the study participant the research kit.

5. The method of claim 1, wherein the computing device comprises a camera and is selected from the group consisting of tablet and a smart phone.

6. The method of claim 1, wherein the research kit further comprises one or more protective cushioning inserts having one or more customized cutouts to receive a set of study instructions.

7. The method of claim 1, further comprising initiating an honoraria payment to the study participant upon receipt of the return container to the research facility.

8. The method of claim 1, wherein the one or more numbered packages include an identifying label having differentiating graphics or iconography.

9. The method of claim 1, wherein the one or more numbered packages include an identifying label having differentiating distinctive coloration.

10. The method of claim 1, wherein the research kit further comprises one or more rating/survey instruments.

11. The method of claim 1, wherein the research kit further comprises a set of one or more cards for sorting exercises.

12. The method of claim 1, further comprising conducting ad hoc guided remote interviews of study participants and responses selected from the group consisting of one or more of a typographic response, a video clip, a photograph, and an audio file, which are configured to be recorded onto a media file and configured to be uploaded to the web-based research application.

13. The method of claim 1, wherein the one or more numbered packages are sequentially numbered.

14. The method of claim 1, wherein the one or more numbered packages are opaque.

15. The method of claim 1, wherein the interview prompts direct the study participant to test the medical test devices in a randomized order to eliminate order-of-presentation effects.

16. The method of claim 1, wherein the research kit further comprises a series of medication administration devices.

17. The method of claim 16, wherein the interview prompts direct the study participant to not open one or more of the one or more numbered packages based upon progression of data input by the study participant.

18. The method of claim 16, wherein the research kit further comprises a rating scale for the study participant to rate the medication administration devices.

19. The method of claim 16, wherein the research kit and the instructions guide the study participant to conduct the test of the medication administration devices in different environments that are part of the study participant's daily routine and enable collection of information including distractions, noise and ambient lighting in different environments.

20. The method of claim 16, wherein the research kit is configured for the study participant to complete the test of the medication administration devices in private, wherein the research kit includes instructions for the study participant to not show their faces during the test of the medication administration devices.

* * * * *